United States Patent
Raju

(10) Patent No.: US 8,732,728 B2
(45) Date of Patent: May 20, 2014

(54) SYSTEM AND METHOD TO ALLOW MULTIPLE PLUG-IN APPLICATIONS REAL-TIME ACCESS TO A CAMERA APPLICATION IN A MOBILE DEVICE

(75) Inventor: Venkatesh Raju, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 345 days.

(21) Appl. No.: 12/658,805

(22) Filed: Feb. 16, 2010

(65) Prior Publication Data

US 2011/0016476 A1 Jan. 20, 2011

Related U.S. Application Data

(60) Provisional application No. 61/271,375, filed on Jul. 20, 2009.

(51) Int. Cl.
*G06F 3/00* (2006.01)
*G06F 9/54* (2006.01)

(52) U.S. Cl.
CPC ..................... *G06F 9/541* (2013.01)
USPC ....................................... 719/319

(58) Field of Classification Search
CPC ................. G06F 9/541; G06F 2203/04802
USPC ........................................ 719/328
See application file for complete search history.

(56) References Cited

U.S. PATENT DOCUMENTS

| | | | |
|---|---|---|---|
| 6,271,752 B1 * | 8/2001 | Vaios | 340/541 |
| 7,720,376 B2 * | 5/2010 | Weinberg et al. | 396/301 |
| 2006/0064759 A1 * | 3/2006 | Agranat | 726/26 |
| 2006/0079214 A1 * | 4/2006 | Mertama et al. | 455/414.1 |
| 2007/0011145 A1 * | 1/2007 | Snyder | 707/3 |
| 2009/0073300 A1 * | 3/2009 | Chung | 348/333.01 |
| 2010/0122165 A1 * | 5/2010 | Uberti | 715/716 |

OTHER PUBLICATIONS

Will Bamford, Space-Time Travel Blogging Using a Mobile Phone, Jul. 17, 2007.*

* cited by examiner

*Primary Examiner* — Lechi Truong

(57) ABSTRACT

A mobile device having a camera application is provided. The mobile device includes a camera and a controller coupled to the camera. The controller is configured to launch a first plug-in application within the camera application. The controller is also configured to launch a second plug-in application within the camera application. The first and second plug-in applications communicate with the camera application through an application programming interface. The controller is further configured to receive, from a user of the mobile device, a selection of one of the first and second plug-in applications. Based on the selection from the user of the mobile device, the controller is configured to update a user interface of the camera application to correspond to the selected plug-in application.

20 Claims, 4 Drawing Sheets

SYSTEM AND METHOD TO ALLOW MULTIPLE PLUG-IN APPLICATIONS REAL-TIME ACCESS TO A CAMERA APPLICATION IN A MOBILE DEVICE

CROSS-REFERENCE TO RELATED APPLICATION(S) AND CLAIM OF PRIORITY

The present application is related to U.S. Provisional Patent Application No. 61/271,375, filed Jul. 20, 2009, entitled "SYSTEM AND METHOD TO ALLOW MULTIPLE THIRD PARTY APPLICATIONS REAL-TIME ACCESS TO THE MOBILE CAMERA'S VIEWFINDER AND IMAGE". Provisional Patent Application No. 61/271,375 is assigned to the assignee of the present application and is hereby incorporated by reference into the present application as if fully set forth herein. The present application hereby claims priority under 35 U.S.C. §119(e) to U.S. Provisional Patent Application No. 61/271,375.

TECHNICAL FIELD OF THE INVENTION

The present application relates generally to mobile communication devices and, more specifically, to giving third party applications access to a mobile device's camera and interface.

BACKGROUND OF THE INVENTION

The introduction of the camera module in mobile phones has made a significant impact to amateur photography. People now have the ability to take pictures whenever and wherever they wish without having to carry a traditional camera.

The growing popularity of online photo sharing and social networking services, coupled with the availability of high speed wireless networking, has created greater interest in the mobile phone's camera feature. Accordingly, phone manufacturers and OEM partners have extended the basic camera application to allow the pictures taken by a mobile phone to be sent to a number of destinations.

SUMMARY OF THE INVENTION

A mobile device having a camera application is provided. The mobile device includes a camera and a controller coupled to the camera. The controller is configured to launch a first plug-in application within the camera application. The controller is also configured to launch a second plug-in application within the camera application. The controller is further configured to receive, from a user of the mobile device, a selection of one of the first and second plug-in applications. Based on the selection from the user of the mobile device, the controller is configured to update a user interface of the camera application to correspond to the selected plug-in application.

A method for use in a mobile device having a camera and a camera application is provided. The method includes launching a first plug-in application within the camera application. The method also includes launching a second plug-in application within the camera application. The method further includes receiving, from a user of the mobile device, a selection of one of the first and second plug-in applications. The method further includes, based on the selection from the user of the mobile device, updating a user interface of the camera application to correspond to the selected plug-in application.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1A through 5B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless or mobile device.

Figure 1A:
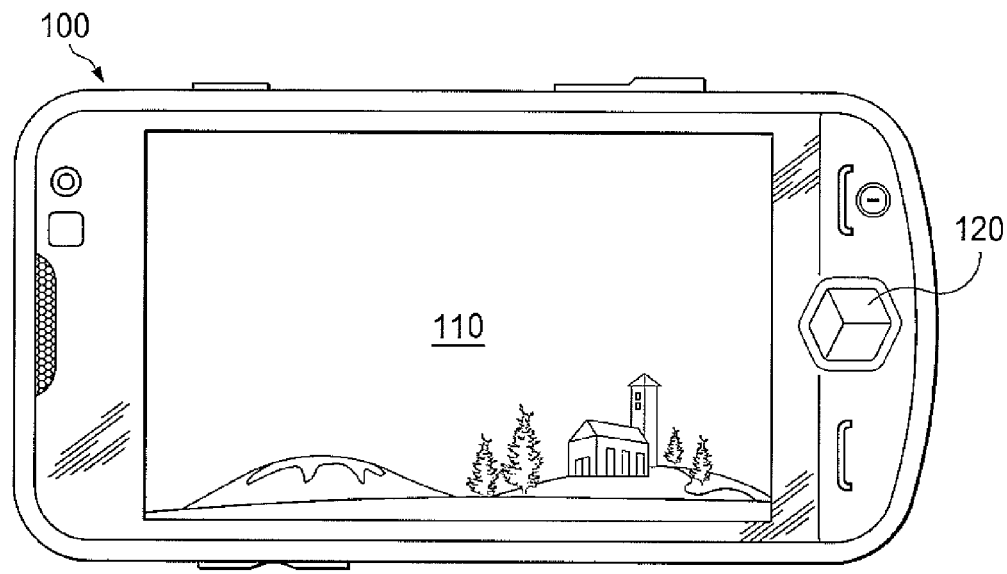
FIG. 1A shows a typical mobile phone being used as a camera.

FIG. 1A shows a typical mobile phone being used as a camera. Mobile phone 100 includes a display 110 and at least one key or button 120. Mobile phone 100 also includes a camera with a basic camera application that uses the display 110 as a viewfinder. Mobile phone 100 uses the existing key or keys 120 to activate camera functions such as the shutter button, zoom, etc. Some mobile phones also have dedicated camera buttons to make the camera features easier to use.

The growing popularity of online photo sharing and social networking services, coupled with the availability of high speed wireless networking, has generated greater interest in the mobile phone's camera feature. This increased interest can be seen in at least two areas.

First, phone manufacturers and OEM partners have extended the basic camera application to allow the pictures taken by a mobile phone to be sent to a number of destinations. For example, the pictures can be saved on the phone's file system, sent via an e-mail to a recipient, uploaded to a specific online photo management service (e.g., Flickr®), or uploaded to a distribution system (e.g., Shozu®) from which the image can be sent to various other destinations.

However, this flexibility has some drawbacks. For example, the user must take the picture before activating the desired feature (such as saving, e-mailing, uploading, etc.). In addition, the features available (such as saving, e-mailing, uploading, etc.) are limited by the choice of the OEM, operator or OEM partner.

Second, application developers have taken advantage of the mobile phone's camera application programming interfaces (APIs) to embed the camera functionality into their own applications. This allows the user to activate the camera from within a specific application, take a picture, and have the application process the image.

Figure 1B:
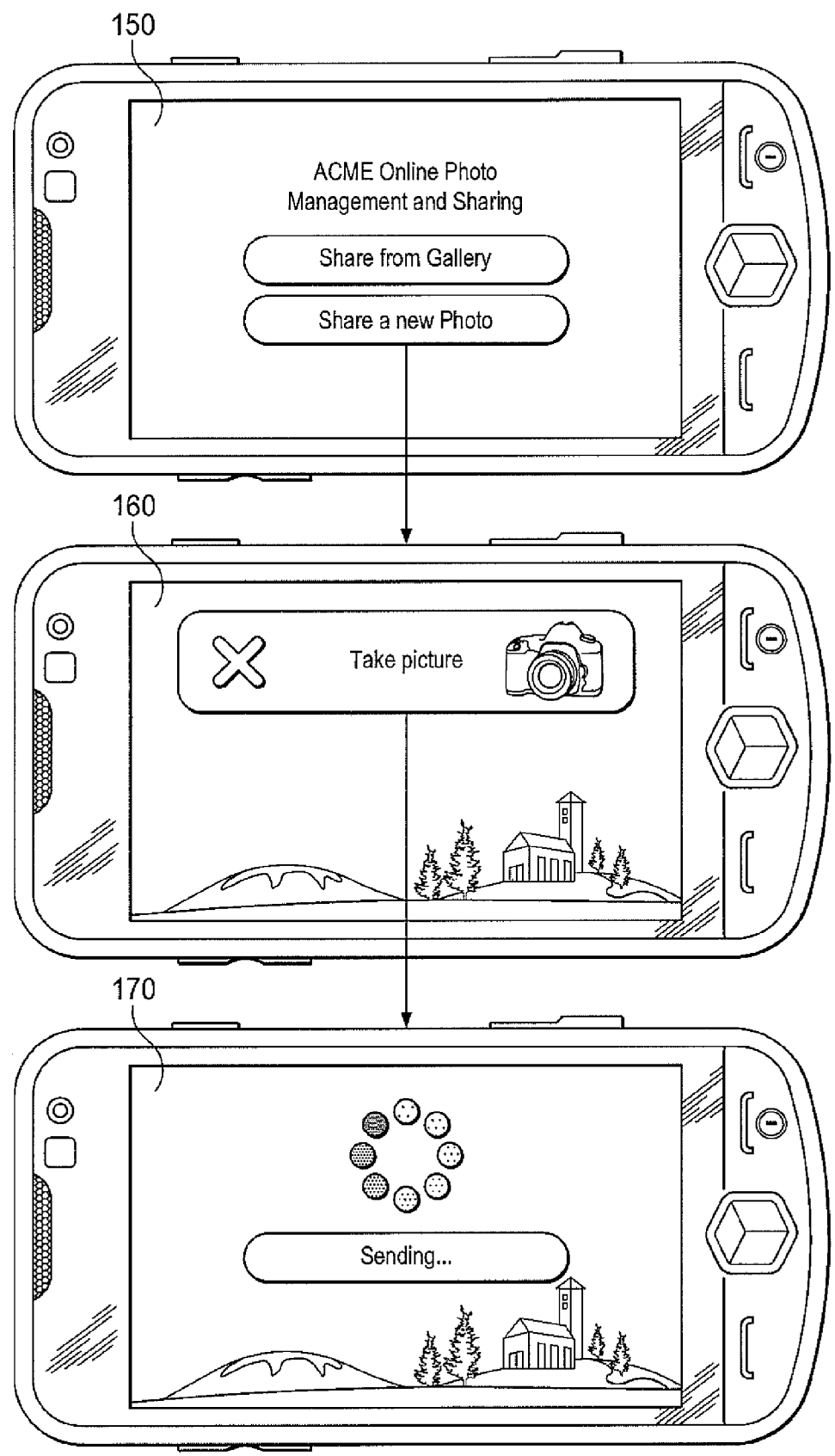
FIG. 1B depicts an application developed by an online photo management service for a mobile phone.

FIG. 1B depicts an application developed by an online photo management service for a mobile phone, such as mobile phone 100. The application includes a user interface 150 that provides options to a user, such as browsing his/her online photo album (gallery) and taking and uploading a new photo without leaving the application. If the user decides to take a new photo, the application opens a camera viewfinder 160 embedded within the application. The application may include functionality 170 to allow the user to immediately send the photo to a destination without leaving the application.

A large number of applications have been developed that incorporate the functionality of the mobile phone's camera. However, an issue with this approach is that the user must launch a specific application and is then captive to that application. The viewfinder images and pictures taken within the application are not available for simultaneous use in other applications. For example, if a user wants to take a video with her camera phone and upload the video to a social networking website, she may have to open one application to take the video, open a second application to edit or annotate the video, and open a third application to upload the video. The second and third applications may not directly interface with the mobile phone's camera or camera application.

This disclosure addresses the above problems and allows new scenarios such as the following:

While at a tourist destination, a user decides to take some pictures and videos and activates the camera feature.

She frames the scene and is interested in knowing more about the objects in the viewfinder.

She activates an augmented reality application right from the viewfinder and sees labels shown on the objects with their names and descriptions.

She then turns off the augmented reality view and decides to capture a few seconds of video.

She activates a live video upload to a video sharing service right from the viewfinder.

After a few seconds, she stops the video upload and decides to take a still photo to upload to her online photo album.

She selects her online service on the viewfinder and presses the shutter button.

The picture is taken and uploaded instantly to her online album.

She then continues to use the camera and perform other functions without leaving the camera application.

Embodiments of the present disclosure provide a new camera application with a plug-in framework that allows multiple third party plug-in applications to use the camera while the camera application is active.

Figure 2:
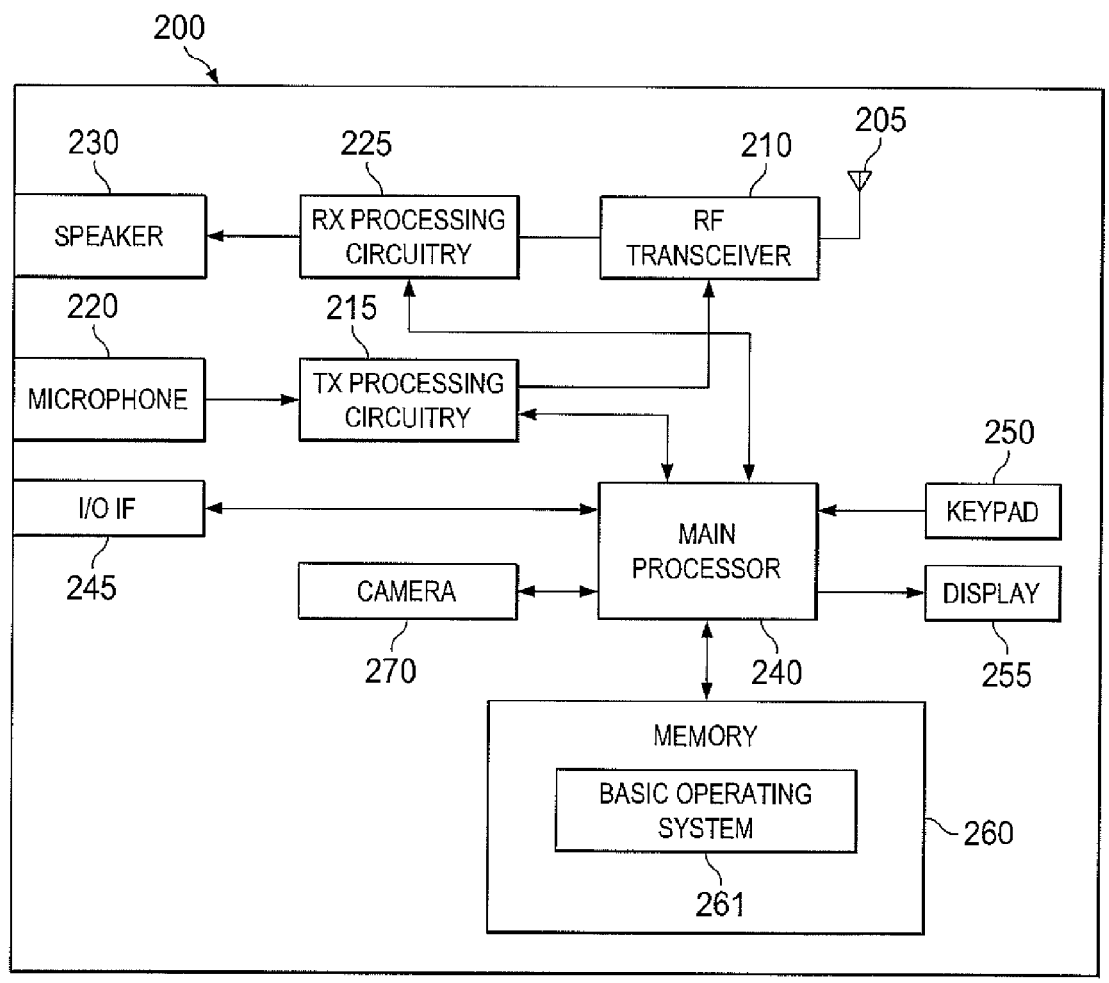
FIG. 2 illustrates a wireless mobile phone according to embodiments of the present disclosure.

FIG. 2 illustrates a wireless mobile phone (also referred to as a mobile station or subscriber station) according to embodiments of the present disclosure. The embodiment of mobile phone 200 illustrated in FIG. 2 is for illustration only. Other embodiments of mobile phone 200 could be used without departing from the scope of this disclosure.

Mobile phone 200 comprises antenna 205, radio frequency (RF) transceiver 210, transmit (TX) processing circuitry 215, microphone 220, and receive (RX) processing circuitry 225. Mobile phone 200 also comprises speaker 230, main processor or controller 240, input/output (I/O) interface (IF) 245, keypad 250, display 255, memory 260, and camera 270.

Radio frequency (RF) transceiver 210 receives from antenna 205 an incoming RF signal transmitted by a base station in a wireless network. Radio frequency (RF) transceiver 210 down-converts the incoming RF signal to produce an intermediate frequency (IF) or a baseband signal. The IF or baseband signal is sent to receiver (RX) processing circuitry 225 that produces a processed baseband signal by filtering, decoding, and/or digitizing the baseband or IF signal. Receiver (RX) processing circuitry 225 transmits the processed baseband signal to speaker 230 (i.e., voice data) or to main processor 240 for further processing (e.g., web browsing).

Transmitter (TX) processing circuitry 215 receives analog or digital voice data from microphone 220 or other outgoing baseband data (e.g., web data, e-mail, interactive video game data) from main processor 240. Transmitter (TX) processing circuitry 215 encodes, multiplexes, and/or digitizes the outgoing baseband data to produce a processed baseband or IF signal. Radio frequency (RF) transceiver 210 receives the outgoing processed baseband or IF signal from transmitter (TX) processing circuitry 215. Radio frequency (RF) transceiver 210 up-converts the baseband or IF signal to a radio frequency (RF) signal that is transmitted via antenna 205.

In some embodiments of the present disclosure, main processor 240 is a microprocessor or microcontroller. Memory 260 is coupled to main processor 240. Memory 260 can be any computer readable medium. For example, memory 260 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. According to such embodiments, part of memory 260 comprises a random access memory (RAM) and another part of memory 260 comprises a Flash memory, which acts as a read-only memory (ROM).

Main processor 240 executes basic operating system (OS) program 261 stored in memory 260 in order to control the overall operation of mobile phone 200. In one such operation, main processor 240 controls the reception of forward channel signals and the transmission of reverse channel signals by radio frequency (RF) transceiver 210, receiver (RX) processing circuitry 225, and transmitter (TX) processing circuitry 215, in accordance with well-known principles.

Main processor 240 is capable of executing other processes and programs resident in memory 260. Main processor 240 can move data into or out of memory 260, as required by an executing process. Main processor 240 is also coupled to camera 270. Main processor 240 and/or camera 270 may include software, hardware, and/or firmware capable of taking, viewing, and processing pictures and/or digital images.

Main processor 240 is also coupled to keypad 250 and display unit 255. The operator of mobile phone 200 uses keypad 250 to enter data into mobile phone 200. Display 255 may be a liquid crystal or light emitting diode (LED) display capable of rendering text and/or graphics from web sites. Alternate embodiments may use other types of displays. In certain embodiments, camera 270 may be integrated in, or otherwise a part of, keypad 250 and display 255.

Figure 3:
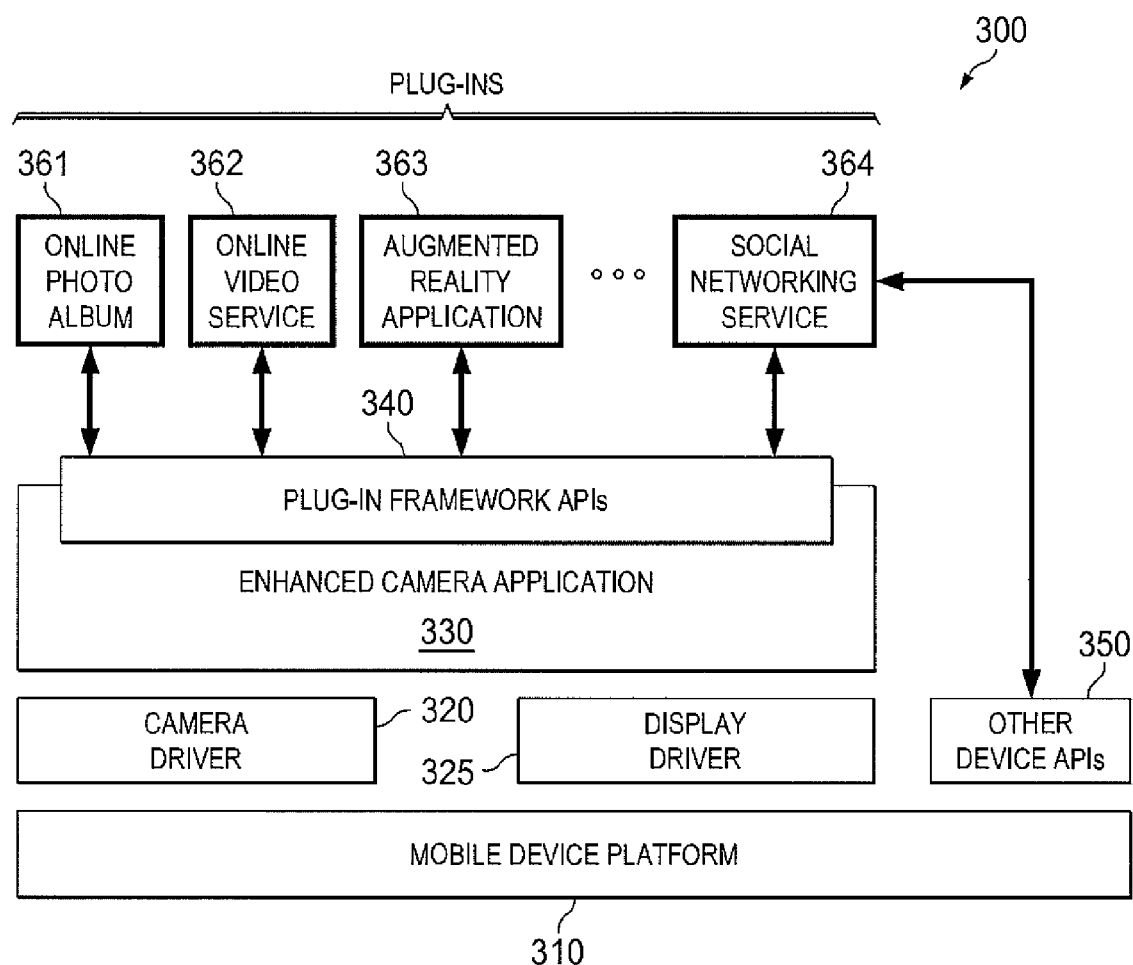
FIG. 3 depicts a high-level architecture of an enhanced camera application and interface, according to one embodiment of the present disclosure.

FIG. 3 depicts a high-level architecture of an enhanced camera application and interface, according to one embodiment of the present disclosure. Architecture 300 is suitable for use in a variety of mobile phones and devices, such as mobile phone 200. Architecture 300 includes mobile device platform 310, camera driver 320, display driver 325, enhanced camera application 330, plug-in framework APIs 340, and other device APIs 350.

Enhanced camera application 330 augments or replaces a basic camera application found in traditional mobile devices. Enhanced camera application 330 includes a tangible machine-readable medium encoded with executable instructions for operating the camera of the mobile device. In certain embodiments, enhanced camera application 330 is part of the mobile device's operating system (e.g., basic operating system 261) and is operable by the main processor of the mobile device (e.g., main processor 240). In other embodiments, enhanced camera application 330 may have a dedicated processor, controller and/or memory.

Enhanced camera application 330 is coupled to an interface that includes plug-in framework APIs 340. The plug-in framework APIs 340 allow third-party developers to build plug-ins 361-364 that are configured to register themselves with enhanced camera application 330. Although four plug-ins are depicted in FIG. 3, it is understood that more, fewer, or other plug-ins are possible. APIs 340 allow plug-ins 361-364 to receive real-time viewfinder images, live video, and pictures taken by the camera included in the mobile phone. Enhanced camera application 330 and APIs 340 also allow plug-ins 361-364 to display data in real-time on the viewfinder.

Once each plug-in 361-364 is installed, enhanced camera application 330 auto-detects the new plug-in application. Then, each time enhanced camera application 330 is started, it will launch one, some, or all of the detected plug-in applications. Upon launching each plug-in application, enhanced camera application 330 may add icons, soft buttons, or other user interface elements to the user interface (UI), as appropriate. For example, enhanced camera application 330 may display icons for each registered plug-in application on the viewfinder. In certain embodiments, each icon may be a graphical image representative of the plug-in application. In other embodiments, each icon may be a soft button. The user interface (UI) may allow for scrolling of the icons if there are more icons than can be shown on the screen at a time. The icons and other user interface elements allow a user to interact with each plug-in application. This is described in greater detail below.

Figure 4:
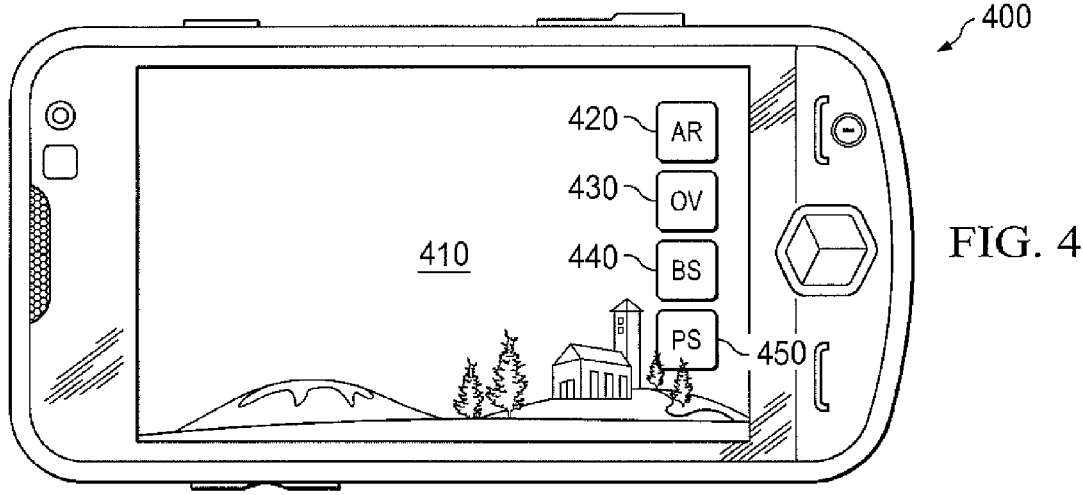
FIG. 4 depicts a view of a mobile phone having an enhanced camera application and interface, according to one embodiment of the present disclosure.

FIG. 4 depicts a view of a mobile phone having an enhanced camera application and interface, according to one embodiment of the present disclosure. Mobile phone 400 displays a viewfinder screen 410 for the enhanced camera application. Viewfinder screen 410 displays icons 420-450 for plug-in applications that have registered with the enhanced camera application. For example, icon 420 may be associated with an augmented reality plug-in. Icon 430 may be associated with an online video plug-in. Icon 440 may be associated with a barcode scanner plug-in. Icon 450 may be associated with a photo sharing plug-in. Other icons may be associated with other plug-in applications. The user can activate or launch one or more plug-in applications by touching, pressing, or otherwise actuating the corresponding icon or icons.

Figure 5A:
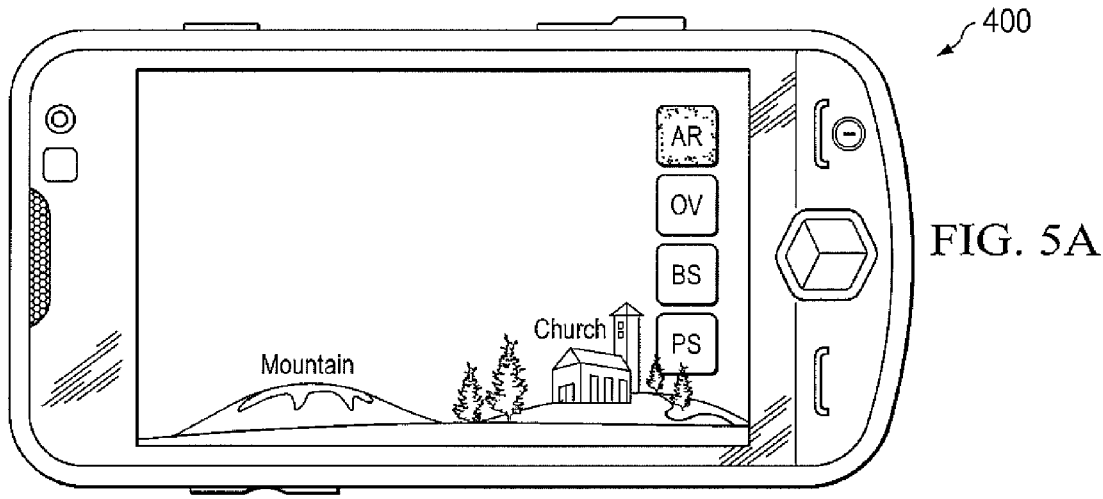
FIGS. 5A and 5B show a mobile phone with different plug-ins activated, according to embodiments of the present disclosure.
Figure 5B:
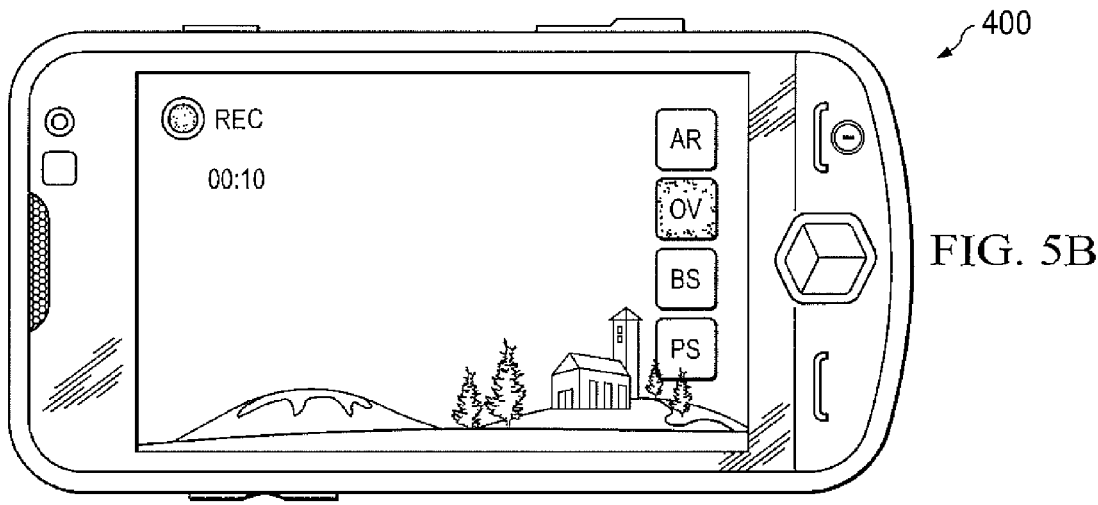

FIGS. 5A and 5B show mobile phone 400 with different plug-ins activated, according to embodiments of the present disclosure. For example, FIG. 5A depicts mobile phone 400 after the augmented reality plug-in application is launched by a user (e.g., by actuating icon 420). While it is active, the augmented reality plug-in application receives a real-time image from the camera through the plug-in framework APIs. The augmented reality plug-in application then processes the image and uses its online database to get information about objects depicted in the scene in the image. The augmented reality plug-in then transmits the information through the framework APIs to display labels directly on the viewfinder of the mobile phone camera, as seen in FIG. 5A.

Control of the camera's user interface may be shared partially, completely, or not at all with a plug-in application. For example, in certain embodiments, the APIs may permit the plug-in application to display information directly on the viewfinder. In other embodiments, the APIs may restrict direct access to the viewfinder, instead requiring the plug-in application to transmit the information to the enhanced camera application; then the enhanced camera application displays the information received from the plug-in application through the APIs.

FIG. 5B depicts mobile phone 400 after the online video plug-in is launched by a user (e.g., by actuating icon 430). While it is active, the online video plug-in application receives a live video stream from the camera through the plug-in framework APIs. The online video plug-in application then encodes the video and uploads the video to an online video service. In some embodiments, this occurs seamlessly and in real-time, without the user having to press additional buttons or otherwise issue additional commands. In certain embodiments, the video may be streamed to the online video service without being saved into the mobile phone's memory. The online video plug-in also uses the framework APIs to display a "Recording" symbol and the current duration on the viewfinder.

In certain embodiments, the enhanced camera application provides a level of continuity and control over the plug-in applications. Different plug-in applications may be used simultaneously or in sequence without the user ever having to exit the enhanced camera application. For example, a user could switch back and forth between the augmented reality plug-in application and the online video plug-in application without exiting the enhanced camera application, just by actuating icons 420 and 430. In some embodiments, if two plug-ins that are activated at the same time require exclusive use of the viewfinder for display, the enhanced camera application can split the viewfinder screen and give each plug-in its own display.

Plug-in applications may be offered from the OEM or service provider's application store. Third-party developers and service providers may employ a variety of business models to charge for plug-ins, including pay-per-use, subscription-based, or one-time purchase fees. The plug-in framework APIs disclosed herein are configurable for various charging models.

Although the disclosed enhanced camera application and interface have been described with respect to a mobile phone, it is understood that the enhanced camera application and interface may also be deployed in other types of mobile device. For example, the enhanced camera application and interface may be deployed in Internet-enabled point-andshoot and digital SLR cameras, mobile Internet devices (MIDs), portable computers (such as laptops and netbooks), and other emerging mobile devices such as smartbooks.

The enhanced camera application and interface disclosed herein will attract third party developers to bring new camera-based applications to devices and elevate the value to consumers. The camera phone has changed the way people use mobile phones, and the disclosed enhanced camera application and interface makes it even easier to do more with the camera feature.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile device having a camera application, the mobile device comprising:
   a camera;
   a viewfinder screen associated with the camera and the camera application, the viewfinder screen comprising a display;
   a controller coupled to the camera, the controller configured to:
      launch a first plug-in application within the camera application;
      launch a second plug-in application within the camera application;
      receive, from a user of the mobile device, a selection of the first and second plug-in applications; and
      based on the selection from the user of the mobile device, update the display of the viewfinder screen to correspond to the selected plug-in applications, wherein the display of the viewfinder screen is configured to show a split screen image, wherein a first part of the split screen image corresponds to the first plug-in application and a second part of the split screen image corresponds to the second plug-in application; and
   an application programming interface configured to permit the first and second plug-in applications to display information directly on the display of the viewfinder screen without first transmitting the information to the camera application.

2. The mobile device of claim 1, wherein the first and second plug-in applications communicate with the camera application through the application programming interface.

3. The mobile device of claim 1, wherein the controller is further configured to:
   simultaneously display on the viewfinder screen of the camera application at least one icon associated with each of the first and second plug-in applications, each icon configured to activate a function of the associated plug-in application.

4. The mobile device of claim 3, wherein each icon is displayed on the viewfinder screen in front of an image representing a scene currently captured by the camera.

5. The mobile device of claim 1, wherein receiving the selection of the selected plug-in applications comprises sensing an actuation by the user of at least one user interface element in the camera application, the user interface element associated with the selected plug-in application.

6. The mobile device of claim 1, wherein the mobile device is one of: a wireless mobile phone, an Internet-enabled camera, and a portable computer.

7. The mobile device of claim 1, wherein the controller is further configured to:
   transmit a live video stream from the camera application to one of the first and second plug-in applications, the live video stream taken by the camera of the mobile device.

8. For use in a mobile device having a camera, a camera application comprising a non-transitory machine-readable medium encoded with instructions that when executed cause a controller to perform:
   launching a first plug-in application within the camera application;
   launching a second plug-in application within the camera application;
   receiving, from a user of the mobile device, a selection of the first and second plug-in applications;
   based on the selection from the user of the mobile device, updating a display of a viewfinder screen associated with the camera application to correspond to the selected plug-in applications, wherein the display of the viewfinder screen is configured to show a split screen image, wherein a first part of the split screen image corresponds to the first plug-in application and a second part of the split screen image corresponds to the second plug-in application; and
   using an application programming interface to display information from the first and second plug-in applications directly on the display of the viewfinder screen without first transmitting the information to the camera application.

9. The camera application of claim 8, wherein the first and second plug-in applications communicate with the camera application through the application programming interface.

10. The camera application of claim 8, wherein the instructions when executed further cause the controller to perform:
   simultaneously displaying on the viewfinder screen of the camera application at least one icon associated with each of the first and second plug-in applications.

11. The camera application of claim 10, wherein each icon is displayed on the viewfinder screen in front of an image representing a scene currently captured by the camera.

12. The camera application of claim 8, wherein receiving the selection of the selected plug-in applications comprises sensing an actuation by the user of at least one user interface element in the camera application, the user interface element associated with the selected plug-in application.

13. The camera application of claim 8, wherein the instructions when executed further cause the controller to perform:
   transmitting a live video stream from the camera application to one of the first and second plug-in applications, the live video stream taken by the camera of the mobile device.

14. For use in a mobile device having a camera and a camera application, a method comprising:
   launching a first plug-in application within the camera application;
   launching a second plug-in application within the camera application;
   receiving, from a user of the mobile device, a selection of the first and second plug-in applications;
   based on the selection from the user of the mobile device, updating a display of a viewfinder screen associated with the camera application to correspond to the selected plug-in applications, wherein the display of the viewfinder screen is configured to show a split screen image, wherein a first part of the split screen image corresponds to the first plug-in application and a second part of the split screen image corresponds to the second plug-in application; and using an application programming interface to display information from the first and second plug-in applications directly on the display of the viewfinder screen without first transmitting the information to the camera application.

15. The method of claim 14, wherein the first and second plug-in applications communicate with the camera application through the application programming interface.

16. The method of claim 14, further comprising:
simultaneously displaying on the viewfinder screen of the camera application at least one icon associated with each of the first and second plug-in applications.

17. The method of claim 16, wherein each icon is displayed on the viewfinder screen in front of an image representing a scene currently captured by the camera.

18. The method of claim 14, wherein receiving the selection of the selected plug-in applications comprises sensing an actuation by the user of at least one user interface element in the camera application, the user interface element associated with the selected plug-in application.

19. The method of claim 14, further comprising:
transmitting a live video stream from the camera application to one of the first and second plug-in applications, the live video stream taken by the camera of the mobile device.

20. The method of claim 14, wherein the mobile device is one of: a wireless mobile phone, an Internet-enabled camera, and a portable computer.

* * * * *